United States Patent [19]

Szmuszkovicz

[11] 3,818,003
[45] June 18, 1974

[54] TRIAZINO[4,3-A][1,4]BENZODIAZEPIN-2(1H)-ONES
[75] Inventor: Jacob Szmuszkovicz, Kalamazoo, Mich.
[73] Assignee: The Upjohn Company, Kalamazoo, Mich.
[22] Filed: Jan. 3, 1972
[21] Appl. No.: 215,118

[52] U.S. Cl. ...... 260/248 AS, 424/249, 260/239 BD
[51] Int. Cl............................................. C07d 57/34
[58] Field of Search............................. 260/248 AS

[56] References Cited
UNITED STATES PATENTS
3,138,593  6/1964  Burch ................................ 260/248

Primary Examiner—John M. Ford
Attorney, Agent, or Firm—Ward F. Nixon

[57] ABSTRACT

Novel 7-substituted-3,5-dihydro-as-triazino[4,3-a]-[1,4]benzodiazepin-2(1H)-ones, 7-substituted-3,5-dihydro-as-triazino[4,3-a][1,4]benzodiazepine-2(1H)-thiones, the 6-oxide derivatives thereof, the intermediate 5-substituted-2,3-dihydro-2-thioxo-1H-1,4-benzodiazepine-1-acetic acid alkyl esters, pharmacologically acceptable acid addition salts thereof, and processes for the production thereof. The compounds of this invention and the pharmacologically acceptable acid addition salts thereof are central nervous system depressants which are useful as sedatives, hypnotics, tranquilizers, muscle relaxants and anticonvulsants. They are also useful as feed additives for increasing growth rate and feed efficiency of livestock and poultry, milk production in mammals and egg production in birds.

8 Claims, No Drawings 3,818,003

TRIAZINO[4,3-A][1,4]BENZODIAZEPIN-2(1H)-ONES

SUMMARY OF THE INVENTION

The novel 7-substituted-3,5-dihydro-as-triazino[4,3-a][1,4]benzodiazepines of this invention and the 6-oxide derivatives thereof are illustratively represented by the generic formulae I and II, respectively, and the novel intermediate 5-substituted-2,3-dihydro-2-thioxo-1H-1,4-benzodiazepine-1-acetic acid alkyl and esters by generic formula III as follows:

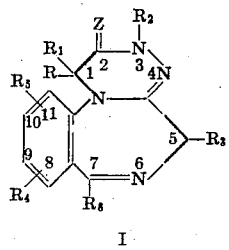

I

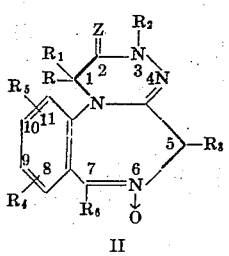

II

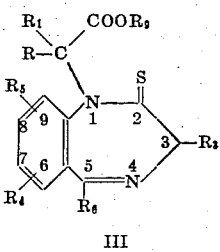

III wherein R, $R_1$ and $R_2$ are each selected from the group consisting of hydrogen and alkyl of 1 to 3 carbon atoms, inclusive; $R_3$ is selected from the group consisting of hydrogen, alkyl of 1 to 3 carbon atoms, inclusive, hydroxy, acetoxy and propionyloxy; $R_4$ and $R_5$ are each selected from the group consisting of hydrogen, alkyl of 1 to 3 carbon atoms, inclusive, halogen, nitro, cyano, amino, trifluoromethyl, alkoxy, alkylthio, alkylsulfinyl, alkylsulfonyl, alkanoylamino and dialkylamino in which the carbon chain moieties are of 1 to 3 carbon atoms, inclusive; $R_6$ is selected from the group consisting of pyridyl, 2-pyrimidinyl, furyl, pyrrolyl, thienyl, cycloalkyl of 5 to 7 carbon atoms, inclusive, and a phenyl radical of the formula

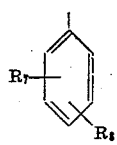

in which $R_7$ and $R_8$ each have the same meanings as given above for $R_4$ and $R_5$; $R_9$ is alkyl of 1 to 3 carbon atoms, inclusive, and Z is selected from the group consisting of oxygen and sulfur.

In this application alkyl is exemplified by methyl, ethyl, propyl and isopropyl. Halogen is exemplified by fluoro, chloro, and bromo. Alkoxy is exemplified by methoxy, ethoxy, propoxy and isopropoxy. Alkylthio is exemplified by methylthio, ethylthio, propylthio and isopropylthio. Alkylsulfinyl is exemplified by methylsulfinyl, ethylsulfinyl, propylsulfinyl and isopropylsulfinyl. Alkylsulfonyl is exemplified by methylsulfonyl, ethylsulfonyl, propylsulfonyl and isopropylsulfonyl. Alkanoylamino is exemplified by formylamino, acetylamino and propionylamino. Dialkylamino is exemplified by dimethylamino, diethylamino, methylethylamino, methylpropylamino, ethylpropylamino, dipropylamino, diisopropylamino and the like. Cycloalkyl is exemplified by cyclopentyl, cyclohexyl and cycloheptyl. Cycloalkenyl is exemplified by 1-cyclopentenyl, 1-cyclohexenyl, 1-cycloheptenyl, 2-cyclopentyl, 2-cyclohexenyl, 2-cycloheptenyl, 3-cyclopentenyl, 3-cyclohexenyl, 3-cycloheptenyl and 4-cycloheptenyl.

The novel compounds of this invention represented by formulae I, II and III, above, exist in either the non-protonated (free base) form or in the protonated (acid addition salt) form, depending on the pH of the environment. They form stable protonates, i.e., pharmacologically acceptable acid addition salts, on acidification of the free base with suitable pharmacologically acceptable acids, for example, hydrochloric, hydrobromic, sulfuric, phosphoric, nitric, acetic, propionic, palmitic, benzoic, salicylic, hexynoic, phenylbutyric, naphthoic, glycolic, succinic, nicotinic, tartaric, maleic, malic, pamoic, methanesulfonic, cyclohexanesulfonic, citric, and lactic acids, and the like. Conversely, the free bases of the novel compounds of formulae I, II and III can be obtained from salts, (e.g., from the hydrochloride or sulfate salt) by neutralization with a base such as sodium hydroxide, extracting with a water-immiscible solvent, for example chloroform, drying the extract, for example with anhydrous sodium sulfate, and removing the solvent by evaporation.

The novel compounds of formulae I, II and III and the pharmacologically acceptable acid addition salts thereof have sedative, hypnotic, anticonvulsant, tranquilizing and muscle relaxant effects in mammals and birds, and are useful as feed additives for increasing the growth rate and feed efficiency of livestock and poultry, milk production during lactation in mammalian species and egg production in avian species.

Sedative effects of the compounds of this invention were determined by the following tests in mice:

Chimney test:

[Med. Exp. 4, 145 (1961)]: The test determines the ability of mice to back up and out of a vertical glass cylinder within 30 seconds. At the effective dosage, 50 percent of the tranquilized mice failed to do so.

Dish test:

Untreated (control) mice in Petri dishes (10 cm. diameter, 5 cm. high, partially embedded in wood shavings), climb out in a very short time. Tranquilized mice remain in the dish for more than 3 minutes. $ED_{50}$ equals the dose of test compound at which 50 percent of the mice remain in the dish.

Pedestal test:

The untreated mouse leaves a standard pedestal in less than a minute to climb back to the floor of the standard mouse box. Tranquilized mice stay on the pedestal for more than 1 minute.

Nicotine antagonism test:

Mice in a group of 6 are injected with the test compound. 30 minutes later the mice including control (untreated) mice are injected with nicotine salicylate (2 mg./kg.). The control mice show over-stimulation, i.e., (1) running convulsions followed by (2) tonic extensor fits; followed by (3) death.

Antagonism to strychnine (as sulfate):

The test consists in orally administering into groups of 6 mice the test compound, and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice. The following compounds typical of this invention have (by intraperitoneal injection) $ED_{50}$ as shown in the table below.

paring solutions or suspensions of the active drug. Sweetening, coloring, and flavoring agents can be added.

Food premixes with starch, oatmeal, dried fishmeat, fishmeal, flour and the like can be prepared and incorporated into an animal feed for mammals and birds.

As feed additives the compounds of formulae I, II and III can be used in dosages of 0.003 mg. to 50 mg./animal/day in a feed to increase growth, feed consumption and feed efficiency in livestock and poultry, milk production in mammals and egg production in birds.

As tranquilizers the compounds of Formulae I, II and III can be used in dosages of 0.01 mg. to 20.0 mg./kg. in oral or injectable preparations as described above, to alleviate tension and anxiety in mammals, or birds, such as occurs when animals are being transported.

| COMPOUND | CH | D | $ED_{50}$ in mg./kg. P | Ni (2) | Ni (3) | Str |
|---|---|---|---|---|---|---|
| 9-chloro-3,5-dihydro-7-phenyl-as-triazino [4,3-a] [1,4]benzodiazepin-2(1H)-one | 10.0 | 23.0 | 23.0 | 9.0 | 10.0 | 40.0 |
| 9-chloro-7-(o-chlorophenyl)-3,5-dihydro-as-triazino [4,3-a] [1,4]benzodiazepin-2(1H)-one | 0.2 | 0.036 | 0.01 | 0.04 | 0.045 | 0.6 |
| 9-chloro-7-(o-chlorophenyl)-3,5-dihydro-3-methyl-as-triazino [4,3-a] [1,4]benzodiazepin-2(1H)-one | 0.9 | 0.09 | 0.22 | 0.06 | 0.07 | 3.2 |
| 7-(o-chlorophenyl)-3,5-dihydro-as-triazino [4,3-a] [1,4]benzodiazepin-2(1H)-one | 10.0 | 0.7 | 2.8 | 0.9 | 0.9 | 112 |
| 7-(o-chlorophenyl)-3,5-dihydro-3-methyl-as-triazino [4,3-a] [1,4]benzodiazepin-2(1H)-one | 28.0 | 4.0 | 6.0 | 4.0 | 4.5 | >100 |
| 9-chloro-3,5-dihydro-3-methyl-7-phenyl-as-triazino [4,3-a] [1,4]benzodiazepin-2(1H)-one | 9.0 | 2.5 | 4.5 | 1.6 | 1.6 | — |
| 7-chloro-2,3-dihydro-5-phenyl-2-thioxo-1H-1,4-benzodiazepine-1-acetic acid methyl ester | 25.0 | 23.0 | 36.0 | 20.0 | 20.0 | >50 |
| 7-chloro-5-(o-chlorophenyl)-2,3-dihydro-2-thioxo-1H-1,4-benzodiazepine-1-acetic acid methyl ester | 11.0 | 25.0 | 79.0 | 25.0 | 29.0 | — |
| 5-(o-chlorophenyl)-2,3-dihydro-2-thioxo-1H-1,4-benzodiazepine-1-acetic acid methyl ester | 36.0 | 9.0 | 63.0 | 79.0 | 56.0 | — |

Ch = chimney test
D = dish test
P = pedestal test
Ni = nicotine antagonism (2), (3) test
Str = strychnine antagonism test The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. For oral administration suitable diluents or carriers such as lactose, proteins, lipids, calcium phosphate, cornstarch, stearic acid, methylcellulose, and the like can be used as carriers or for coating purposes. Oils, such as coconut oil, sesame oil, safflower oil, cottonseed oil, and peanut oil can be used for pre-

DETAILED DESCRIPTION OF THE INVENTION

The novel compounds of this invention and processes for their production are illustratively represented by the following sequence of formulae:

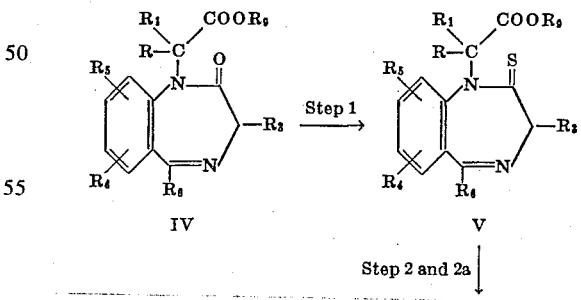

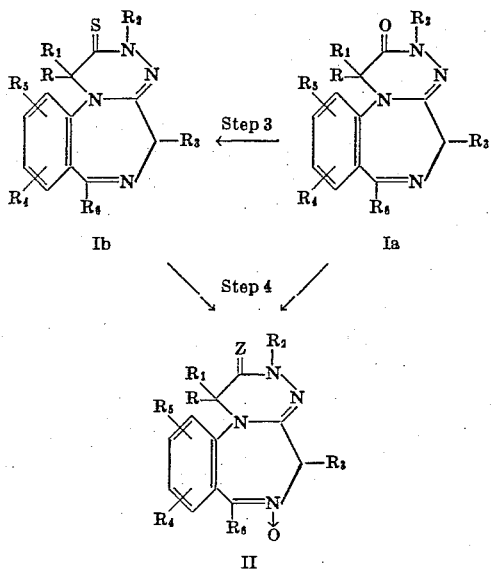

wherein R, $R_1$, $R_2$, $R_3$, $R_4$, $R_5$, $R_6$, and Z have the meanings previously given.

The starting compounds of formula IV are for the most part known; for example, their preparation is disclosed in Belgium Pat. No. 64/2839 published Dec. 23, 1964. They are prepared by reacting the sodium salt of a compound of the formula:

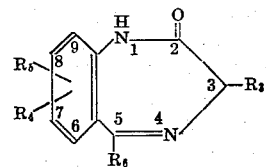

wherein $R_3$, $R_4$, $R_5$ and $R_6$ have the meanings previously given, with an alkyl 2-haloalkanoate of the formula

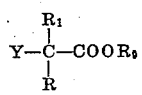

wherein R, $R_1$ and $R_9$ have the meanings previously given and Y is selected from the group consisting of chlorine, bromine and iodine. The reaction is conducted in an organic solvent medium such as methanol, ethanol, propanol, dimethylformamide, benzene, boluene, mixtures thereof and the like. Temperature and pressure are not critical; the reaction can be carried out at room temperature or at elevated temperatures, at atmospheric pressure or at elevated or reduced pressures. A temperature of from about 50° C. to about 125° C. and atmospheric pressure are generally preferred.

The process of this invention comprises the following steps:

1. A 2,3-dihydro-2-oxo-1H-1,4-benzodiazepine-1-acetic acid alkyl ester (IV) is heated with phosphorus pentasulfide in a solvent such as pyridine, benzene, toluene or xylene at between about 80° to about 140° C. for between about 30 minutes to about 24 hours in accordance with the procdure disclosed by Archer et al., J. Org. Chem. 29, 231 (1964) and U.S. Pat. No. 2,422,091. The 2,3-dihydro-2-thioxo-1H-1,4-benzodiazepine-1-acetic acid alkyl esters of formula V thus obtained are recovered from the reaction mixture and purified by conventional methods, for example by chromatography or silica gel and/or crystallization from a suitable organic solvent such as an alkanol, e.g., methanol, ethanol, 1-propanol, 2-propanol and the like, methylene chloride, chloroform, ethyl acetate, mixtures thereof and the like.

2. The 2,3-dihydro-2thioxo-1H-1,4-benzodiazepine-1-acetic acid alkyl ester (V) thus obtained is reacted with a hydrazine of the forumula:

$$R_2 - NH - NH_2$$

VIII wherein $R_2$ has the meaning previously given to produce a compound of formula Ia. In carrying out the reaction compound V, is heated to between about 60° to 140° C. (preferably at reflux temperature) with one molar equivalent of the desired hydrazine of formula VIII in an organic solvent, preferably a lower alkanol, e.g., methanol, ethanol, 1-propanol, 2-propanol, 1-butanol, 2-butanol, dioxane and the like. The reaction period is between about 1 to about 48 hours. At the termination of the reaction, the resulting 3,5-dihydro-as-triazino[4,3-a][1,4]benzodiazepin-2(1H)-one (Ia) is isolated from the reaction mixture by conventional methods, for example, by crystallization directly from the reaction mixture, followed by recrystallization from a suitable organic solvent such as a lower alkanol, chloroform, ether, ethyl acetate, methylene chloride and the like or mixtures thereof such as methanol-chloroform and the like; or by gradient elution chromatography from an absorbent column, e.g., silica gel, with a suitable solvent such as acetone, ethyl acetate, ether, methylene chloride, cyclohexane, Skellysolve B, hexane, a lower alkanol, mixtures thereof such as methanol-ethyl acetate, ethyl acetatecyclohexane and the like.

2a Alternatively, compounds of formula Ia wherein $R_2$ is alkyl are prepared by alkylating a compound of formula Ia wherein $R_2$ is hydrogen. The latter compound is converted to the sodium or potassium salt with sodium hydride or potassium hydride and the salt is treated with an alkyl halide of the formula:

$$R_2 - Y$$

IX wherein $R_2$ is alkyl as hereinbefore defined and Y is halogen as hereinbefore defined. The reaction is preferable carried out in an inert organic solvent such as dimethylformamide and at a temperature within the range of from about 50° to 140° C. The product is recovered from the reaction mixture by conventional methods, for example the solvent is removed by evaporation, water is added and the product is recovered by filtration or extraction with a water-immiscible organic solvent.

3. The 3,5-dihydro-as-triazino[4,3-a][1,4]benzodiazepin-2(1H)-thiones of formula Ib are prepared by treatment of the corresponding compounds of formula Ia with phosphorus pentasulfide in accordance with the precedures disclosed in Step 1 above.

The 3,5-dihydro-as-triazino[4,3-a][1,4]benzodiazepin-2(1H)-ones (Ia) and the 3,5-dihydro-as-triazino[4,3-a]-[1,4]benzodiazepin-2(1H)-thiones (Ib) are converted to the corresponding 6-oxides (II) by reacting them with a peracid such as peracetic acid, perphthalic acid, perbenzoic acid, m-chloroperbenzoic acid and the like. The reaction is conducted in a suitable organic solvent such as a lower alkanol, e.g., methanol, ethanol, 1-propanol, 2-propanol and 2-butanol; chloroform, methylene chloride and the like at a temperature within the range of from about 0° C. to about 25° C. for a period of from about 6 to 48 hours. The resulting 6-oxides (II) are recovered from the reaction medium and purified by conventional methods such as chromatography and/or crystallization.

The following Preparations and Examples are illustrative of the products and processes of the present invention but are not to be construed as limiting.

Preparation 1 7-chloro-2,3-dihydro-2-oxo-5-phenyl-1H-1,4-benzodiazepine-1-acetic acid methyl ester (IV)

Sodium methoxide (5.95 g., 0.11 mole) is added to a solution of 7-chloro-1,3-dihydro-5-phenyl-2H-1,4-benzodiazepin-2-one (VI) (27 g., 0.1 mole) in 200 ml. of dimethylformamide and the mixture is stirred and heated on a steam bath for about 20 minutes. To this mixture is added a solution of methyl bromoacetate (VII) (16.7 g., 0.11 mole) in 165 ml. of toluene during 1 hour while stirring and heating are continued. The mixture is heated for an additional 2 hours, allowed to stand overnight at room temperature (about 25° C.) and evaporated to dryness in vacuo. The residue is stirred with 500 ml. of water until a suspension results. The sususpension is filtered and the solid thus obtained is crystallized first from ether and then from methanol to give 14.5 g. (42 percent yield) of 7-chloro-2,3-dihydro-2-oxo-5-phenyl-1H-1,4-benzodiazepine-1-acetic acid methyl ester (IV); m.p. 137°–138° C.; ultraviolet, infrared, NMR and mass spec. are in accordance with the structure.

Preparation 2 7-chloro-5-(o-chlorophenyl)-2,3-dihydro-2-oxo-1H-1,4-benzodiazepine-1-acetic acid methyl ester (IV)

Sodium methoxide (5.95 g., 0.11 mole) is added to a solution of 7-chloro-1,3-dihydro-5-(o-chlorophenyl)-2H-1,4-benzodiazepin-2-one (VI) (30.5 g., 0.1 mole) in 200 ml. of dimethylformamide and the mixture is heated at 95° for about 15 minutes. To the mixture is added a solution of methyl bromoacetate (VII) (16.7 g., 0.11 mole) in 165 ml. of toluene during 55 minutes while heating is continued. After heating the mixture for an additional 6.25 hours it ie evaporated to dryness, and the residue is stirred with 400 ml. of water and 200 ml. of ether. The resulting suspension is filtered and the solid thus obtained is crystallized from methylene chloride-methanol to give 24.9 g. of 7-chloro-5-(o-chlorophenyl)-2,3-dihydro-2-oxo-1H-1,4-benzodiazepine-1-acetic acid methyl ester (IV); m.p. 193°–194° C.

Anal. Calcd. for $C_{18}H_{14}Cl_2N_2O_3$: C, 57.31; H, 3.74; Cl, 18.80; N, 7.43.

Found: C, 57.38; H, 4.03; Cl, 18.92; N, 7.55.

Preparation 3 5-(o-chlorophenyl)-2,3-dihydro-2-oxo-1H-1,4-benzodiazepine-1-acetic acid methyl ester (IV)

Sodium methoxide (2.26 g.; 0.042 mole) is added to a solution of 5-(o-chlorophenyl)-1,3-dihydro-2H-1,4-benzodiazepin-2-one (VI) (10.3 g., 0.038 mole) in 100 ml. of dimethylformamide and the mixture is heated at 95° for about 25 minutes. To the mixture is added a solution of methyl bromoacetate (VII) (6.4 g., 0.042 mole) in 65 ml. of toluene during 45 minutes while heating is continued. The mixture is heated for an additional 5.5 hours and allowed to stand overnight. It is evaporated to dryness and the residue is stirred with a mixture of 150 ml. of water and 150 ml. of ether. The resulting suspension is filtered and the solid thus obtained is crystallized from methanol to give 7.9 g. of 5-(o-chlorophenyl)-2,3-dihydro-2-oxo-1H-1,4-benzodiazepine -1-acetic acid methyl ester (IV): m.p. 166°–167.5° C.

Anal. Calcd. for $C_{18}H_{15}ClN_2O_3$: C, 63.07; H, 4.41; Cl, 10.34; N, 8.17.

Found: C, 62.87; H, 4.44; Cl, 10.38; N, 8.17.

Preparation 4 7-chloro-2,3dihydro-α-methyl-2-oxo-5-(2,6-difluorophenyl)-1H-1,4-benzodiazepine-1-acetic acid methyl ester (IV)

A mixture of 0.1 mole of 7-chloro-1,3-dihydro-5-(2,6-difluorophenyl)-2H-1,4-benzodiazepin-2-one (VI) and 0.11 mole of sodium methoxide in about 200 ml. of tetrahydrofuran is heated at about 95° C. for about 20 minutes. To the mixture is added a solution of 0.11 mole of methyl 2-bromopropionate (VII) in about 200 ml. of toluene over a period of about 1 hour at about 95° C., and heating is continued for an additional period of about 6 hours. The reaction mixture is then evaporated in vacuo and the residue thus obtained is stirred with about 500 ml. of water. The resulting suspension is filtered and the solids thus obtained are crystallized from a suitable organic solvent such as ether, methanol, methylene chloride, methylene chloride-methanol and the like to obtain 7-chloro-2,3-dihydro-α-methyl-2-oxo-5-(2,6-difluorophenyl)-1H-1,4-benzodiazepine-1-acetic acid methyl ester (IV).

Preparation 5 7-trifluoromethyl-2,3-dihydro-2-oxo-5-phenyl-1H-1,4-benzodiazepine-1-acetic acid ester (IV)

A mixture of 0.1 mole of 7-trifluoromethyl-1,3-dihydro-5-phenyl-2H-1,4-benzodiazepin-2-one (VI) and 0.11 mole of sodium methoxide in about 200 ml. of tetrahydrofuran is heated at about 95° C. for about 20 minutes. To the mixture is added a solution of 0.11 mole of ethyl bromoacetate (VII) in about 200 ml. of toluene over a period of about 1 hour at about 95° C., and heating is continued for an additional period of about 6 hours. The reaction mixture is then evaporated in vacuo and the residue thus obtained is stirred with about 500 ml. of water. The resulting suspension is filtered and the solids thus obtained are crystalized from a suitable organic solvent such as ether, methanol, methylene chloride, methylene chloride-methanol and the like to obtain 7-trifluoromethyl-2,3-dihydro-2-oxo-5-phenyl-1H-1,4-benzodiazepin-1-acetic acid ethyl ester (IV).

Preparation 6 7-chloro-2,3-dihydro-α,α-dimethyl-2-oxo-5-phenyl-1H-1,4-benzodiazepine-1-acetic acid methyl ester (IV)

A mixture of 0.1 mole of 7-chloro-1,3-dihydro-5-phenyl-2H-1,4-benzodiazepin-2-one (VI) and 0.11 mole of sodium methoxide in about 200 ml. of tetrahydrofuran is heated at about 95° C. for about 20 minutes. To the mixture is added a solution of 0.11 mole of methyl 2-bromo-2-methyl propionate (VII) in about 200 ml. of toluene over a period of about 1 hour at about 95° C., and heating is continued for an additional period of about 6 hours. The reaction mixture is then evaporated in vacuo and the residue thus obtained is stirred with about 500 ml. of water. The resulting suspension is filtered and the solids thus obtained are crystallized from a suitable organic solvent such as ether, methanol, methylene chloride, methylene chloride-methanol and the like to obtain 7-chloro-2,3-dihydro-α,α-dimethyl-2-oxo-5-phenyl-1H-1,4-benzodizepine-1-acetic acid methyl ester (IV).

Preparation 7 7-chloro-α-ethyl-2,3-dihydro-α-methyl-2-oxo-5-(0-chlorophenyl)-1H-1,4-benzodiazepine-1-acetic acid propyl ester (IV)

A mixture of 0.1 mole of 7-chloro-1,3-dihydro-5-(o-chlorophenyl)-2H-1,4-benzodiazepin-2-one (VI) and 0.11 mole of sodium methoxide in about 200 ml. of tetrahydrofuran is heated at about 95° C. for about 20 minutes. To the mixture is added a solution of 0.11 mole of propyl 2-bromo-2-methylbutyrate (VII) in about 200 ml. of toluene over a period of about 1 hour at about 95° C., and heating is continued for an additional period of about 6 hours. The reaction mixture is then evaporated in vacuo and the residue thus obtained is stirred with about 500 ml. of water. The resulting suspension is filtered and the solids thus obtained are crystallized from a suitable organic solvent such as ether, methanol, ethylene chloride, methylene chloride methanol and the like to obtain 7-chloro-α-ethyl-2,3-dihydro-α-methyl-2-oxo-5-(o-chlorophenyl)-1H-1,4-benzodiazepine-1-acetic acid propyl ester (IV).

Preparation 8 7-bromo-2,3-dihydro-2-oxo-α-propyl-5-(2-pyridyl)-1H-1,4-benzodiazepine-1-acetic acid methyl ester (IV)

A mixture of 0.1 mole of 7-bromo-1,3-dihydro-5-(2-pyridyl)-2H-1,4-benzodiazepin-2-one (VI) and 0.11 mole of sodium methoxide in about 200 ml. of tetrahydrofuran is heated at about 95° C. for about 20 minutes. To the mixture is added a solution of 0.11 mole of methyl 2-bromovalerate (VII) in about 200 ml. of toluene over a period of about 1 hour at about 95° C., and heating is continued for an additional period of about 6 hours. The reaction mixture is then evaporated in vacuo and the residue thus obtained is stirred with about 500 ml. of water. The resulting suspension si filtered and the solids thus obtained are crystallized from a suitable organic solvent such as ether, methanol, methylene chloride, methylene chloride-methanol and the like to obtain 7-bromo-2,3-dihydro-2-oxo-α-propyl5-(2-pyridyl)-1H-1,4-benzodiazepine-1-acetic acid methyl ester (IV).

Preparation 9 7-chloro-5-cyclohexyl-2,3-dihydro-α-isopropyl-2-oxo-1H-1,4-benzodiazepine-1-acetic acid methyl ester (IV)

A mixture of 0.1 mole of 7-chloro-1,3-dihydro-5-cyclohexyl-2H-1,4-benzodiazepin-2-one (VI) and 0.11 mole of sodium methoxide in about 200 ml. of tetrahydrofuran is heated at about 95° C. for about 20 minutes. To the mixture is added a solution of 0.11 mole of methyl 2-bromo-3methylbutyrate (VII) in about 200 ml. of toluene over a period of about 1 hour at about 95° C., and heating is continued for an additional period of about 6 hours. The reaction mixture is then evaporated in vacuo and the residue thus obtained is stirred with about 500 ml. of water. The resulting suspension is filtered and the solids thus obtained are crystallized from a suitable organic solvent such as ether, methanol, methylene chloride, methylene chloride-methanol and the like to obtain 7-chloro-5-cyclohexyl-2,3-dihydro-α-isopropyl-2-oxo-1H-1,4-benzodiazepine-1-acetic acid methyl ester (IV).

In the manner given in Preparations 1–9 above, other 1,3-dihydro-2H-1,4-benzodiazepin-2-ones of formula VI can be reacted with the appropriate alkyl 2-haloalkanoate of formula VII to obtain other 2,3-dihydro-2-oxo-1H-1,4-benzodiazepine-1-acetic acid alkyl esters of formula IV. For example, the following 1,3-dihydro-2H-1,4-benzoidazepin-2-ones:

7-bromo-1,3-dihydro-5-phenyl-2H-1,4-benzodiazepin-2-one;
7-fluoro-1,3-dihydro-5-phenyl-2H-1,4-benzodiazepin-2-one;
1,3-dihydro-7-nitro-5-phenyl-2H-1,4-benzodiazepin-2-one;
7-cyano-1,3-dihydro-5-phenyl-2H-1,4-benzodiazepin-2-one;
1,3-dihydro-7-methylthio-5-phenyl-2H-1,4-benzodiazepin-2one;
7-bromo-5-(0-chlorophenyl)-1,3-dihydro-2H-1,4-benzodiazepin-2-one;
5-(o-chlorophenyl)-7-fluoro-1,3-dihydro-2H-1,4-benzodiazepin-2-one;
5-(o-chlorophenyl)-1,3-dihydro-7-nitro-2H-1,4-benzodiazepin-2-one;
5-(o-chlorophenyl)-1,3-dihydro-7-(trifluoromethyl)-2H-1,4-benzodiazepin-2one;
5-(o-chlorophenyl)-7-cyano-1,3-dihydro-2H-1,4-benzodiazepin-2-one;
5-(o-chlorophenyl)-1,3-dihydro-7-(methylthio)-2H-1,4-benzodiazepin-2-one;
7-chloro-5-(o-fluorophenyl)-1,3-dihydro-2H-1,4-benzodiazepin-2-one;
7-fluoro-5-(o-fluorophenyl)-1,3-dihydro-2H-1,4-benzodiazepin-2-one;
5-(o-fluorophenyl)-1,3-dihydro-7-nitro-2H-1,4-benzodiazepin-2-one;
5-(o-fluorophenyl)-1,3-dihydro-7-(trifluoromethyl)-2H-1,4-benzodiazepin-2-one;
7-cyano-5-(o-fluorophenyl)-1,3-dihydro-2H-1,4-benzodiazepin-2-one;
5-(o-fluorophenyl)-1,3dihydro-7-(methylthio)-2H-1,4-benzodiazepin-2-one;
7-chloro-1,3-dihydro-5-(2-pyrimidinyl)-2H-1,4-benzodiazepin-2-one;
7-bromo-5-(2-furyl)-1,3-dihydro-2H-1,4-benzodiazepin-2-one;
7-fluoro-1,3-dihydro-5-(2-pyrrolyl)-2H-1,4-benzodiaze-pin-2-one;

1,3-dihydro-7-nitro-5-(2-thienyl)-2H-1,4-benzodiazepin-2-one;

5-cyclohexyl-1,3-dihydro-7-(trifluoromethyl)-2H-1,4-benzodiazepin-2-one;

7-cyano-5-(1-cyclohexenyl)-1,3-dihydro-2H-1,4-benzodiazepin-2-one and the like can be reacted with a 2-haloalkanoate (VII), for example, methyl bromoacetate, to obtain:

7-bromo-2,3-dihydro-2-oxo-5-phenyl-1H-1,4-benzodiaze-pine-1-acetic acid methyl ester;
7-fluoro-2,3-dihydro-2-oxo-5-phenyl-1H-1,4-benzodiaze-pine-1-acetic acid methyl ester;
2,3-dihydro-7-nitro-2-oxo-5-phenyl-1H-1,4-benzodiaze-pine-1-acetic acid methyl ester;
7-cyano-2,3-dihydro-2-oxo-5-phenyl-1H-1,4-benzodiaze-pine-1-acetic acid methyl ester;
2,3-dihydro-7-(methylthio)-2-oxo-5-phenyl-1H-1,4-benzodiazepine-1-acetic acid methyl ester;
7-bromo-5-(o-chlorophenyl)-2,3-dihydro-2-oxo-1H-1,4-benzodiazepine-1-acetic acid methyl ester;
5-(o-chlorophenyl)-7-fluoro-2,3-dihydro-2-oxo-1H-1,4-benzodiazepine-1-acetic acid methyl ester;
5-(o-chlorophenyl)-2,3-dihydro-7-nitro-2-oxo-1H-1,4-benzodiazepine-1-acetic acid methyl ester;
5-(o-chlorophenyl)-2,3-dihydro-2-oxo-7-(trifluoromethyl)1H-1,4-benzodiazepine-1-acetic acid methyl ester;
5-(o-chlorophenyl)-7-cyano-2,3-dihydro-2-oxo-1H-1,4-benzodiazepine-1-acetic acid methyl ester;
5-(o-chlorophenyl)-2,3-dihydro-7-(methylthio)-2-oxo-1H-1,4-benzodiazepine-1-acetic acid methyl ester;
7-chloro-5-(o-fluorophenyl)-2,3-dihydro-2-oxo-1H-1,4-benzodiazepine-1-acetic acid methyl ester;
7-bromo-5-(o-fluorophenyl)-2,3-dihydro-2-oxo-1H-1,4-benzodiazepine-1-acetic acid methyl ester;
7-fluoro-5-(o-fluorophenyl)-2,3-dihydro-2-oxo-1H-1,4-benzodiazepine-1-acetic acid methyl ester;
5-(o-fluorophenyl)-2,3-dihydro-7-nitro-2-oxo-1H-1,4-benzodiazepine-1-acetic acid methyl ester;
5-(o-fluorophenyl)-2,3-dihydro-2-oxo-7-(trifluoromethyl)-1H-1,4-benzodiazepine-1-acetic acid methyl ester;
7-cyano-5-(o-fluorophenyl)-2,3-dihydro-2-oxo-1H-1,4-benzodiazepine-1-acetic acid methyl ester;
5-(o-fluorophenyl)-2,3-dihydro-7-(methylthio)-2-oxo-1H-1,4-benzodiazepine-1-acetic acid methyl ester;
7-chloro-2,3-dihydro-2-oxo-5-(2-pyrimidinyl)-1H-1,4-benzodiazepine-1-acetic acid methyl ester;
7-bromo-5-(2-furyl)-2,3-dihydro-2-oxo-1H-1,4-benzodiazepine-1-acetic acid methyl ester;
7-fluoro-2,3-dihydro-2-oxo-5-(2-pyrrolyl)-1H-1,4-benzodiazepine1-acetic acid methyl ester;
2,3-dihydro-7-nitro-2-oxo-5-(2-thienyl)-1H-1,4-benzodeazepine-1-acetic acid methyl ester;
5-cyclohexyl-2,3-dihydro-2-oxo-7-(trifluoromethyl)-1H-1,4-benzodiazepine-1-acetic acid methyl ester;
7-cyano-5-(1-cyclohexenyl)-2,3-dihydro-2-oxo-1H-1,4-benzodeazepine-1-acetic acid methyl ester; respectively, and the like.

Similarly other alkyl 2-haloalkanoates of formula VII such as:
ethyl chloroacetate
propyl bromoacetate
isopropyl iodoacetate
methyl 2-bromopropionate
methyl 2-chlorobutyrate
ethyl 2-iodovalerate
propyl 2-bromo-3-methylbutyrate
methyl 2-bromo-2-methylpropionate
propyl 2-bromo-2-ethylbutyrate
methyl 2-chloro-2-methylbutyrate
ethyl 2-bromo-2-ethylvalerate
and the like, can be substituted in place of methyl bromoacetate to obtain the corresponding 2,3-dihydro-2-oxo-1H-1,4-benzodiazepin-1-acetic acid alkyl esters of formula IV.

Example 1  7-chloro-2,3-dihydro-5-phenyl-2-thioxo-1H-1,4-benzodiazepine-1-acetic acid methyl ester (V)

A mixture of 6.35 g. (0.0186 mole) of 7-chloro-2,3-dihydro-2-oxo-5-phenyl-1H-1,4-benzodiazepine-1-acetic acid methyl ester (IV), 4.42 g. (0.0199 mole) of phosphorus pentasulfide and 185 ml. of pyridine is heated under reflux for about 19 hours. The pyridine is evaporated, 100 ml. of cold water is added, and the product is extracted with four 100-ml. portions of methylene chloride. The extracts are combined, washed with sodium bicarbonate solution and with saturated salt solution, dried over magnesium sulfate and evaporated to give 2.4 g. of residue. The residue thus obtained is extracted with eight 250-ml. portions of boiling ether. The extracts are combined and concentrated. On standing 2.1 g. of 7-chloro-2,3-dihydro-5-phenyl-2-thioxo-1H-1,4Benzodiazepin-1-acetic acid methyl ester (V), m.p. 180°–182° C. crystallizes from solution; recrystallization from ether raises the melting point to 185°–187° C.

Example 2  7-chloro-2,3-dihydro-5-phenyl-2-thioxo-1H-1,4-benzodiazepine-1-acetic acid methyl ester (V)

The procedure of Example 1 is repeated to the point where a residue is obtained following evaporation of the methylene chloride. The residue thus obtained is chromatographed on silica gel using 50 percent ethyl acetate-cyclohexane to give 7-chloro-2,3-dihydro-5-phenyl-2-thioxo-1H-1,4-benzodiazepine-1-acetic acid methyl ester (V), m.p. 188°–189° C. (from ether).

Anal. Calcd. for $C_{18}H_{15}ClN_2O_2S$: C, 60.24; H, 4.21; Cl, 9.88; N, 7.81; S, 8.94.

Found: C, 60.14; H, 4.40; Cl, 9.81; N, 7.76; S, 9.06.

Example 3  7-chloro-5-(o-chlorophenyl)-2,3-dihydro-2-thioxo-1H-1,4-benzodiazepine-1-acetic acid methyl ester (V)

A mixture of 3.8 g. (0.01 mole) of 7-chloro-5-(o-chlorophenyl)-2,3-dihydro-2-oxo-1H-1,4-benzodiazepine-1-acetic acid methyl ester (IV), 2.3g. (0.0105 mole) of phosphorus pentasulfide and 100 ml. of pyridine is heated under reflux for about 22 hours. the reaction mixture is evaporated and the residue thus obtained is dissolved in chloroform and 100 ml. of aqueous sodium bicarbonate solution. The organic layer is separated, washed with three 50-ml. portions of aqueous sodium bicarbonate solution and with saturated salt solution, dried over anhydrous magnesium sulfate and evaporated to remove the solvent. The residue (4.1 g.) thus obtained is dissolved in about 20 ml. of methylene chloride and chromatographed on 410 g. of silica gel. Elution with 50 percent ethyl acetate-methylene chloride gives 1.79 g. of 7-chloro-5-(o-chlorophenyl)-2,3-dihydro-2-thioxo-1H-1,4-benzodiazepine-1-acetic acid methyl ester. Recrystallization from ether gives 7-chloro-5-(o-chlorophenyl)-2,3-dihydro-2-thioxo-1H-1,4-benzodiazepine-1-acetic acid methyl ester (V), m.p. 191°–192° C.; a sample recrystallized from methanol melts at 193°–194° C.

Anal. Calcd. for $C_{18}H_{14}Cl_2N_2O_2S$: C, 54.97; H, 3.59; Cl, 18.03; N, 7.12; S, 8.15.

Found: C, 54.82; H, 3.71; Cl, 18.15; N, 6.91; S, 8.37.

Example 4 5-(o-chlorophenyl)-2,3-dihydro-2-thioxo-1H-1,4-benzodiazepine-1-acetic adid methyl ester (V)

A mixture of 7.75 g. (0.0226 mole) of 5-(o-chlorophenyl)-2,3-dihydro-2-oxo-1H-1,4-benzodiazepine-1-acetic acid methyl ester (IV), 5.3g. (0.0238 mole) of phosphorus pentasulfide and 200 ml. of pyridine is heated under reflux for about 23 hours. The reaction mixture is then evaporated and the residue thus obtained is dissolved in methylene chloride-water. The organic layer is separated, washed with five 100-ml. portions of saturated aqueous sodium bicarbonate solution, dried over anhydrous magnesium sulfate and evaporated to remove the solvent. The residue (7.3 g.) thus obtained is dissolved in 50 ml. of methylene chloride and chromatographed on 730 g. of silica gel. Elution with 60 percent ethyl acetate-cyclohexane gives 4.8 g. of product which is triturated with methanol, filtered and washed with ether to give 3.5 g. of 5-(o-chlorphenyl)-2,3-dihydro-2-thioxo-1H-1,4-benzodiazepine-1-acetic acid methyl ester (V); a sample after recrystallization from methanol-chloroform melts at 183°–184° C.

Anal. Calcd. for $C_{18}H_{15}ClN_2O_2S$: C, 60.24; H, 4.21; Cl, 9.88; N, 7.81; S, 8.94.

Found: C, 60.11; H, 4.20; Cl, 10.06; N, 7.39; S, 9.06.

Example 5 7-chloro-5-(2,6-difluorophenyl)-2,3-dihydro-α-methyl-2-thioxo-1H-1,4-benzodiazepine-1-acetic acid methyl ester (V)

A mixture of 0.01 mole of 7-chloro-5-(2,6-difluorophenyl)-2,3-dihydro-α-methyl-2-oxo-1H-1,4-benzodiazepin-1-acetic acid methyl ester (IV), 0.0105 mole of phosphorus pentasulfide and 100 ml. of pyridine is heated under reflux for about 24 hours. The reaction mixture is evaporated and the residue thus obtained is dissolved in methylene chloride-water. The organic layer is separated, washed with saturated sodium bicarbonate solution, dried over anhydrous magnesium sulfate and evaporated to remove the solvent. The residue thus obtained is chromatographed on silica gel and eluted to give 7-chloro-5-(2,6-difluorophenyl)-2,3-dihydro-α-methyl-2-thioxo-1H-1,4-benzodiazepine-1-acetic acid methyl ester (V).

Example 6 2,3-dihydro-5-phenyl-2-thioxo-7-(trifluoromethyl)-1H-1,4-benzodiazepine-1-acetic acid ethyl ester (V)

A mixture of 0.01 mole of 7-trifluoromethyl-2,3-dihydro-2-oxo-5-phenyl-1H-1,4-benzodiazepin-1-acetic acid ethyl ester (IV) and 0.0105 mole of phosphorus pentasulfide and 100 ml. of pyridine is heated under reflux for about 24 hours. The mixture is evaporated and the residue thus obtained is dissolved in methylene chloride-water. The organic layer is separated, washed with saturated sodium bicarbonate solution, dried over anhydrous magnesium sulfate and evaporated to remove the solvent. The residue thus obtained is chromatographed on silica gel and eluted to give 2,3-dihydro-5-phenyl-2-thioxo-7-(trifluoromethyl)-1H-1,4-benzodiazepine-1-acetic acid ethyl ester (V).

Example 8 7-chloro-α-ethyl-2,3-dihydro-α-methyl-2-thioxo-5-(o-chlorophenyl)-1H-1,4-benzodiazepine-1-acetic acid propyl ester (V)

A mixture of 0.01 mole of 7-chloro-α-ethyl-2,3-dihydro-α-methyl-2-oxo-5-(o-chlorophenyl)-1H-1,4-benzodiazepine-1-acetic acid propyl ester (IV), 0.0105 mole of phosphorus pentasulfide and 100 ml. of pyridine is heated under reflux for about 24 hours. The mixture is evaporated and the residue thus obtained is dissolved in methylene chloride-water. The organic layer is separated, washed with saturated sodium bicarbonate solution, dried over anhydrous magnesium sulfate and evaporated to remove the solvent. The residue thus obtained is chromatographed on silica gel and eluted to give 7-chloro-α-ethyl-2,3-dihydro-α-methyl-2-thioxo-5-(o-chlorophenyl)-1H-1,4-benzodiazepine-1-acetic acid propyl ester (V)

Example 9 7-bromo-2,3-dihydro-α-propyl-5-(2-pyridyl)-2-thioxo-1H-1,4-benzodiazepine-1-acetic acid methyl ester (V)

A mixture of 0.01 mole of 7-bromo-2,3-dihydro-α-propyl-5-(2-pyridyl)-1H-1,4-benzodiazepine-1-acetic acid methyl ester (IV), 0.0105 mole of phosphorus pentasulfide and 100 ml. of pyridine is heated under reflux for about 24 hours. The mixture is evaporated and the residue thus obtained is dissolved in methylene chloride-water. The organic layer is separated, washed with saturated sodium bicarbonate solution, dried over anhydrous magnesium sulfate and evaporated to remove the solvent. The residue thus obtained is chromatographed on silica gel and eluted to give 7-bromo-2,3-dihydro-α-propyl-5-(2-pyridyl-2-thioxo-1H-1,4-benzodiazepine-1-acetic acid methyl ester (V).

Example 10 7-chloro-5-cyclohexyl-2,3-dihydro-α-isopropyl-2-thioxo-1H-1,4-benzodiazepine-1-acetic acid methyl ester (V)

A mixture of 0.01 mole of 7-chloro-5-cyclohexyl-2,3-dihydro-α-isopropyl-2-oxo-1H-1,4-benzodiazepine-1-acetic acid methyl ester (IV), 0.0105 mole of phosphorus pentasulfide and 100 ml. of pyridine is heated under reflux for about 24 hours. The mixture is evaporated and the residue thus obtained is dissolved in methylene chloride-water. The organic layer is separated, washed with saturated sodium bicarbonate solution, dried over anhydrous magnesium sulfate and evaporated to remove the solvent. The residue thus obtained is chromatographed on silica gel and eluted to give 7-chloro-5-cyclohexyl-2,3-dihydro-α-isopropyl-2-thioxo-1H-1,4-benzodiazepine-1-acetic acid methyl ester (V).

In the manner given in Examples 1–10, above, other 2,3-dihydro-2-oxo-1H-1,4-benzodiazepine-1-acetic acid alkyl esters of formula IV, for example those prepared and listed in Preparation 9 above are reacted with phosphorus pentasulfide to obtain the corresponding 2,3-dihydro-2-thioxo-1H-1,4-benzodiazepine-1-acetic acid alkyl esters of formula V, such as:

7-bromo-2,3-dihydro-5-phenyl-2-thioxo-1H-1,4-benzodiazepine-1-acetic acid methyl ester;

7-fluoro-2,3-dihydro-5-phenyl-2-thioxo-1H-1,4-benzodiazepine-1-acetic acid methyl ester;

2,3-dihydro-7-nitro-5-phenyl-2-thioxo-1H-1,4-benzodiazepine-1-acetic acid methyl ester;

7-cyano-2,3-dihydro-5-phenyl-2-thioxo-1H-1,4-benzodiazepine-1-acetic acid methyl ester;

5-(o-chlorophenyl)-2,3-dihydro-7-(methylthio)-2-thioxo-1H-1,4-benzodiazepine-1-acetic acid methyl ester;

7-bromo-5-(o-chlorophenyl)-2,3-dihydro-2-thioxo-1,4-benzodiazepine-1-acetic acid methyl ester;

5-(o-chlorophenyl)-7-fluoro-2,3-dihydro-2-thioxo-1H-1,4-benzodiazepine-1-acetic acid methyl ester;

5-(o-chlorophenyl)-2,3-dihydro-7-nitro-2-thioxo-1H-1,4-benzodiazepine-1-acetic acid methyl ester;

5-(o-chlorophenyl)-2,3-dihydro-2-thioxo-7-(trifluoromethyl)-1H-1,4benzodiazepine-1-acetic acid methyl ester;

5-(o-chlorophenyl)-7-cyano-2,3-dihydro-2-thioxo-1H-1,4-benzodiazepine-1-acetic acid methyl ester;

5(o-chlorophenyl)-2,3-dihydro-7-(methylthio)-2-thixo-1H-1,4-benzodiazepine-1acetic acid methyl ester;

7-chloro-5-(o-fluorophenyl)-2,3-dihydro-2-thioxo-1H-1,4-benzodiazepine-1-acetic acid methyl ester;

7-bromo-5-(o-fluorophenyl)-2,3-dihydro-2-thioxo-1H-1,4-benzodiazepine-1-acetic acid methyl ester;

7-fluoro-5-(o-fluorophenyl)-2,3-dihydro-2-thioxo-1H-1,4benzodiazepine-1-acetic acid methyl ester;

5-(o-fluorophenyl)-2,3-dihydro-7-nitro-2-thioxo-1H-1,4-benzodiazepine-1-acetic acid methyl ester;

5-(o-fluorophenyl)-2,3-dihydro-2-thioxo-7-(trifluoromethyl)-1H-1,4-benzodiazepine-1-acetic acid methyl ester;

7-cyano-5-(o-fluorophenyl)-2,3-dihydro-2-thioxo-1H-1,4-benzodiazepine-1-acetic acid methyl ester;

5-(o-fluorophenyl)-2,3-dihydro-7(methylthio)-2-thioxo-1H-1,4-benzodiazepine 1-acetic acid methyl ester;

7-chloro-2,3-dihydro-5-(2-pyrimidinyl)-2-thioxo-1H-1,4-benzodiazepine-1-acetic acid methyl ester;

7-bromo-5-(2-furyl)-2,3-dihydro-2-thioxo-1H-1,4-benzodiazepine-1-acetic acid methyl ester;

7-fluoro-2,3-dihydro-5-(2-pyrrolyl)-2-thioxo-1H-1,4-benzodiazepine-1-acetic acid methyl ester;

2,3-dihydro-5-(2-thienyl)-7-nitro-2-thioxo-1H-1,4-benzodiazepine-1-acetic acid methyl ester;

5-cyclohexyl-2,3-dihydro-2-thioxo-7-(trifluoromethyl)-1H-1,4-benzodiazepine-1-acetic acid methyl ester;

7-cyano-5-(1-cyclohexenyl)-2,3-dihydro-2-thioxo-1H-1,4-benzodiazepine-1-acetic acid methyl ester and the like.

Example 11   9-chloro-3,5-dihydro-7-phenyl-as-triazino-[4,3-a][1,4]benzodiazepin-2(1H)-one (Ia)

A mixture of 0.5 g. (1.4 millimoles) of 7-chloro-2,3-dihydro-5-phenyl-2-thioxo-1H-1,4-benzodiazepine-1-acetic acid methyl ester (V), 70 mg. (1.4 millimoles) of hydrazine hydrate (VIII) and 10 ml. of methanol is refluxed for about 3.75 hours. The mixture is allowed to cool, and the crystalline precipitate which separates is collected on a filter; yield, 0.280 g. of 9-chloro-3,5-dihydro-7-phenyl-as-triazino[4,3-a][1,4]benzodiazepin-2(1H)-one (Ia), m.p. 267°–270° C.

Anal. Calcd. for $C_{17}H_{13}ClN_4O$: C, 62.87; H, 4.03; Cl, 10.92; N, 17.25.

Found: C, 62.60; H, 3.99; Cl, 10.69; N, 17.10.

Example 12   9-chloro-7-(o-chlorophenyl)-3,5-dihydro-as-triazino[4,3-a][1,4]benzodiazepin-2(1H)-one (Ia)

A mixture of 1.06 g. (2.7 millimoles) of 7-chloro-5-(o-chlorophenyl)-2,3-dihydro-2-thioxo-1H-1,4-benzodiazepine-1-acetic acid methyl ester (V), 0.14 g. (2.7 millimoles) of hydrazine hydrate (VIII) and 20 ml. of methanol is refluxed for about 5 hours. The reaction mixture is then concentrated to about half of its original volume and allowed to crystallize to give on filtration 0.81 g. of 9-chloro-7-(o-chlorophenyl)-3,5-dihydro-as-triazino[4,3-a][1,4]benzodiazepin-2(1H)-one (Ia), m.p. 232°–233° C.

Anal. Calcd. for $C_{17}H_{12}Cl_2N_4O$: C, 56.84; H, 3.37; Cl, 19.74; N, 15.60.

Found: C, 56.35; H, 3.33; Cl, 19.92; N, 15.59.

Example 13   9-chloro-7-(o-chlorophenyl)-3,5-dihydro-3-methyl-as-triazino[4,3-a][1,4]benzodiazepin-2(1H)-one (Ia)

A mixture of 0.8 g. (2.03 millimoles) of 7-chloro-5-(o-chlorophenyl)-2,3-dihydro-2-thioxo-1H-1,4-benzodiazepine-1-acetic acid methyl ester (V), 94 mg. (2.03 millimoles) of methyl hydrazine (VIII) and 20 ml. of methanol is heated under reflux for about 16 hours and then allowed to stand for 2 days. The mixture is evaporated and the residue is dissolved in 10 ml. of 50 percent ethyl acetate-cyclohexane and 3 ml. of methylene chloride and chromatographed on 90 g. of silica gel. Elution with 5 percent methanol-ethyl acetate gives 0.441 g. of 9-chloro-7-(o-chlorophenyl)-3,5-dihydro-3-methyl-as-triazino[4,3-a][1,4]benzodiazepin-2(1H)-one (Ia). Crystallization from ether afforded 0.255 g. of 9-chloro-7-(o-chlorophenyl)-3,5-dihydro-3-methyl-as-triazino[4,3-a]-[1,4]benzodiazepin-2(1H)-one (Ia); m.p. 170°–171° C.

Anal. Calcd. for $C_{18}H_{14}Cl_2N_4O$: C, 57.92; H, 3.78; Cl, 19.00; N, 15.01.

Found: C, 57.62; H, 3.87; Cl, 18.79; N, 14.88.

Example 14   7-(o-chlorophenyl)-3,5-dihydro-as-triazino-[4,3-a][1,4]benzodiazepin-2(1H)-one (Ia)

A mixture of 1.5 g. (4.34 millimoles) 5-(o-chlorophenyl)-2,3-dihydro-2-thioxo-1H-1,4-benzodiazepine-1-acetic acid methyl ester (V), 0.217 g. (4.34 millimoles) of hydrazine hydrate (VIII) and 20 ml. of methanol is heated under reflux for about 18.5 hours, concentrated to about half volume and allowed to stand. A yield of 1.004 g. of crystalline 7-(o-chlorophenyl)-3,5-dihydro-as-triazino-[4,3-a][1,4]benzodiazepin-2(1H)-one (Ia), m.p. 194°–196° C., is obtained. Recrystallization from methanol-methylene chloride raises the m.p. 195°–196.5° C.

Anal. Calcd. for $C_{17}H_{13}ClN_4O \cdot H_2O$: C, 59.56; H, 4.41; Cl, 10.34; N, 16.53.

Found: C, 59.67; H, 4.58; Cl, 10.92; N, 16.64.

Example 15   7-(o-chlorophenyl)-3,5-dihydro-3-methyl-as-triazino[4,3-a][1,4]benzodiazepin-2(1H)-one (Ia)

A mixture of 1.55 g. (4.34 millimoles) of 7-(o-chlorophenyl)-2,3-dihydro-2-thioxo-1H-1,4- benzodiazepine-1-acetic acid methyl ester (V), 0.199 g. (4.34 millimoles) of methylhydrazine (VIII) and 20 ml. of methanol is heated under reflux for about 18.5 hours. The reaction mixture is allowed to crystallize to give 0.303 g. of unreacted starting material which separates and is removed by filtration. The filtrate is evaporated and the residue thus obtained is dissolved in about 5 ml. of methylene chloride and chromatographed on 110 g. of silica gel. Elution with ethyl acetate gives 0.806 g. of 7-(o-chlorophenyl)-3,5-dihydro-3-methyl-as-triazino[4,3-a][1,4]benzodiazepin-2(1H)-one (Ia) as an oil; UV, IR and NMR (CDCl$_3$) spectra are in accord with the structure.

Example 16 9-chloro-3,5-dihydro-3-methyl-7-phenyl-as-triazino[4,3-a][1,4]benzodiazepin-2(1H)-one (Ia)

A mixture of 1.1 g. (3.08 millimoles) of 7-chloro-2,3-dihydro-5-phenyl-2-thioxo-1H-1,4-benzodiazepine-1-acetic acid methyl ester (V), 0.142 g. (3.08 millimoles) of methylhydrazine (VIII) and 20 ml. of methanol is heated under reflux for about 20 hours. The reaction mixture is evaporated and the residue thus obtained is chromatographed on 240 g. of silica gel. Elution with ethyl acetate gives 0.523 g. of 9-chloro-3,5-dihydro-3-methyl-7-phenyl-as-triazino[4,3-a][1,4]benzodiazepin-2(1H)-one (Ia), which is recrystallized from ether to give 0.477 g. of 9-chloro-3,5-dihydro-3-methyl-7-phenyl-as-triazino[4,3-a][1,4]benzodiazepin-2(1H)-one (Ia) as colorless needles; m.p. 175°–176° C.

Example 17 9-chloro-7-(2,6-difluorophenyl)-3-ethyl-3,5-dihydro-1-methyl-as-triazino[4,3-a][1,4]-benzodiazepin-2(1H)-one (Ia)

A mixture of 3.0 millimoles of α-methyl-7-chloro-2,3-dihydro-5-(2,6-difluorophenyl)-2-thioxo-1H-1,4-benzodiazepine-1-acetic acid methyl ester (V), 3.0 millimoles of ethyl hydrazine (VIII) and 20 ml. of methanol is heated under reflux until the reaction is complete. The reaction mixture is then evaporated to dryness, and the residue thus obtained is chromatographed on silica gel and eluted therefrom to give 9-chloro-7-(2,6-difluorophenyl-3-ethyl-3,5-dihydro-1-methyl-as-triazino[4,3-a][1,4]benzodiazepin-2(1H)-one (Ia).

Example 18 3,5-dihydro-7-phenyl-3-propyl-9-trifluoromethyl-as-triazino[4,3-a][1,4]benzodiazepin-2(1H)-one (Ia)

A mixture of 3-millimoles of 2,3-dihydro-5-phenyl-2-thioxo-7-(trifluoromethyl)-1H-1,4-benzodiazepine-1-acetic acid ethyl ester (V), 3.0 millimoles of propylhydrazine (VIII) and 20 ml. of methanol is heated under reflux until the reaction is complete. The reaction mixture is then evaporated to dryness, and the residue thus obtained is chromatographed on silica gel and eluted therefrom to give 3,5-dihydro-7-phenyl-3-propyl-9-trifluoromethyl-as-triazino-[4,3-a][1,4]benzodiazepin-2(1H)-one (Ia).

Example 19 9-chloro-3,5-dihydro-3-isopropyl-1,1-dimethyl-7-phenyl-as-triazino[4,3-a][1,4]-benzodiazepin-2(1H)-one (Ia)

A mixture of 3.0 millimoles of 7-chloro-2,3-dihydro-α,α-dimethyl-5-phenyl-2-thioxo-1H-1,4-benzodiazepine-1-acetic acid methyl ester (V), 3.0 millimoles of isopropylhydrazine (VIII) and 20 ml. of methanol is heated under reflux until the reaction is complete. The reaction mixture is then evaporated to dryness, and the residue thus obtained is chromatographed on silica gel and eluted therefrom to give 9-chloro-3,5-dihydro-3-isopropyl-1,1-dimethyl-7-phenyl-as-triazino[4,3-a][1,4]benzodiazepin-2(1H)-one (Ia).

Example 20 9-chloro-7-(o-chlorophenyl)-1-ethyl-3,5-dihydro-1,3-dimethyl-as-triazino[4,3-a][1,4]-benzodiazepin-2(1H)-one (Ia)

A mixture of 3.0 millimoles of 7-chloro-5-(o-chlorophenyl)-α-ethyl-2,3-dihydro-α-methyl-2-thioxo-1H-1,4-benzodiazepine-1-acetic acid propyl ester (V), 3.0 millimoles of methyl hydrazine (VIII) and 20 ml. of methanol is heated under reflux until the reaction is complete. The solvent is then removed from the reaction mixture by evaporation and the residue thus obtained is chromatographed on silica gel and eluted therefrom to give 9-chloro-7-(o-chlorophenyl)-1-ethyl-3,5-dihydro-1,3-dimethyl-as-triazino-[4,3-a][1,4]benzodiazepin-2(1H)-one (Ia).

Example 21 9-bromo-3-ethyl-3,5-dihydro-1-propyl-7-(2-pyridyl)-as-triazino[4,3-a][1,4]benzodiazepin-2(1H)-one (Ia)

A mixture of 3.0 millimoles of 7-bromo-2,3-dihydro-α-propyl-5-(2-pyridyl)-2-thioxo-1H-1,4-benzodiazepine-1-acetic acid methyl ester (V), 3.0 millimoles of ethyl hydrazine (VIII) and 20 ml. of methanol is heated under reflux until the reaction is complete. The solvent is then removed from the reaction mixture by evaporation and the residue thus obtained is chromatographed on silica gel and eluted therefrom to give 9-bromo-3-ethyl-3,5-dihydro-1-propyl-7-(2-pyridyl)-as-triazino[4,3-a][1,4]benzodiazepin-2(1H)-one (Ia).

Example 22 9-chloro-7-cyclohexyl-3,5-dihydro-1-isopropyl-3-propyl-as-triazino[4,3-a][1,4]benzodiazepin-2(1H)-one (Ia)

A mixture of 3.0 millimoles of 7-chloro-5-cyclohexyl-2,3-dihydro-α-isopropyl-2-thioxo-1H-1,4-benzodiazepine-1-acetic acid methyl ester (V), 3.0 millimoles of propylhydrazine (VIII) and 20 ml. of methanol is heated under reflux until the reaction is complete. The solvent is then removed from the reaction mixture by evaporation and the residue thus obtained is chromatographed on silica gel and eluted therefrom to give 9-chloro-7-cyclohexyl-3,5-dihydro-1-isopropyl-3-propyl-as-triazino[4,3-a][1,4]benzodiazepin-2(1H)-one (Ia).

In the manner given in Examples 11–22, above, other 2,3-dihydro-2-thioxo-1H-1,4-benzodiazepine-1-acetic acid alkyl esters of formula V, for example those prepared and listed in Example 10 above, are condensed with the appropriate hydrazine of formula VIII to obtain other 3,5-dihydroas-triazino[4,3-a][1,4]benzodiazepin-2(1H)-ones of formula Ia; for example reaction with hydrazine hydrate yields:

9-bromo-3,5-dihydro-7-phenyl-as-triazino[4,3-a][1,4]-benzodiazepin-2(1H)-one;
9-fluoro-3,5-dihydro-7-phenyl-as-triazino[4,3-a][1,4]-benzodiazepin-2(1H)-one;
3,5-dihydro-9-nitro-7-phenyl-as-triazino[4,3-a][1,4]-benzodiazepin-2(1H)-one;
3,5-dihydro-7-phenyl-9-(trifluoromethyl)-as-triazino-[4,3-a][1,4]benzodiazepin-2(1H)-one;
9-cyano-3,5-dihydro-7-phenyl-as-triazino[4,3-a][1,4]-benzodiazepin-2(1H)-one;
3,5-dihydro-9-(methylthio)-7-phenyl-as-triazino[4,3-a]-[1,4]benzodiazepin-2(1H)-one;
9-bromo-7-(o-chlorophenyl)-3,5-dihydro-as-triazino-[4,3-a][1,4]benzodiazepin-2(1H)-one;
7-(o-chlorophenyl)-9-fluoro-3,5-dihydro-as-triazino-[4,3-a][1,4]benzodiazepin-2(1H)-one;

7-(o-chlorophenyl)-3,5-dihydro-9-nitro-as-triazino-[4,3-a][1,4]benzodiazepin-2(1H)-one;

7-(o-chlorophenyl)-3,5-dihydro-9-(trifluoromethyl)-as-triazino[4,3-a][1,4]benzodiazepin-2(1H)-one;

7-(o-chlorophenyl)-9-cyano-3,5-dihydro-as-triazino-[4,3-a][1,4]benzodiazepin-2(1H)-one;

7-(o-chlorophenyl)-3,5-dihydro-9-(methylthio)-as-triazino[4,3-a][1,4]benzodiazepin-2(1H)-one;

9-chloro-7-(o-fluorophenyl)-3,5-dihydro-as-triazino-[4,3-a][1,4]benzodiazepin-2(1H)-one;

9-bromo-7-(o-fluorophenyl)-3,5-dihydro-as-triazino-[4,3-a][1,4]benzodiazepin-2(1H)-one;

9-fluoro-7-(o-fluorophenyl)-3,5-dihydro-as-triazino-[4,3-a][1,4]benzodiazepin-2(1H)-one;

7-(o-fluorophenyl)-3,5-dihydro-9-nitro-as-triazino-[4,3-a][1,4]benzodiazepin-2(1H)-one;

7-(o-fluorophenyl)-3,5-dihydro-9-(trifluoromethyl)-as-triazino[4,3-a][1,4]benzodiazepin-2(1H)-one;

7-(o-chlorophenyl)-9-cyano-3,5-dihydro-as-triazino-[4,3-a][1,4]benzodiazepin-2(1H)-one;

7-(o-fluorophenyl)-3,5-dihydro-9-(methylthio)-as-triazino[4,3-a][1,4]benzodiazepin-2(1H)-one;

9-chloro-3,5-dihydro-7-(2-pyrimidinyl)-as-triazino-[4,3-a][1,4]benzodiazepin-2(1H)-one;

9-bromo-7-(2-furyl)-3,5-dihydro-as-triazino[4,3-a]-[1,4]benzodiazepin-2(1H)-one;

9-fluoro-3,5-dihydro-7-(2-pyrrolyl)-as-triazino[4,3-a]-[1,4]benzodiazepin-2(1H)-one;

3,5-dihydro-9-nitro-7-(2-thienyl)-as-triazino[4,3-a]-[1,4]benzodiazepin-2(1H)-one;

7-cyclohexyl-3,5-dihydro-9-(trifluoromethyl)-as-triazino[4,3-a][1,4]benzodiazepin-2(1H)-one; and 9-cyano-7-(1-cyclohexenyl)-3,5-dihydro-as-triazino-[4,3-a][1,4]benzodiazepin-2(1H)-one respectively, and the like.

In the same manner other alkylhydrazines of formula VIII, namely
methylhydrazine,
ethylhydrazine,
propylhydrazine, and
isopropylhydrazine,
can be substituted in place of hydrazine hydrate to obtain the corresponding 3-alkyl-substituted-3,5-dihydro-as-triazino[4,3-a][1,4]benzodiazepin-2(1H)-ones of formula (Ia); e.g., compounds corresponding to the compounds named hereinabove.

Example 23 9-chloro-3,5-dihydro-7-phenyl-as-triazino-[4,3-a][1,4]benzodiazepine-2(1H)-thione A mixture of 0.01 mole of 9-chloro-3,5-dihydro-7-phenyl-as-triazino[4,3-a][1,4]benzodiazepin-2(1H)-one, 0.0105 mole of phosphorus pentasulfide and 100 ml. of pyridine is heated under reflux until the reaction is complete and then the solvent is diluted with about 100 ml. of water and extracted with three 100-ml. portions of methylene chloride. The methylene chloride extracts are combined, washed with aqueous sodium bicarbonate solution, then with aqueous saturated salt solution and evaporated to remove the solvent. The residue thus obtained is redissolved in methylene chloride, chromatographed on silica gel and eluted to give 9-chloro-3,5-dihydro-7-phenyl-as-triazino-[4,3-a][1,4]benzodiazepine-2(1H)-thione.

In the same manner following the procedures of Example 23, other 3,5-dihydro-as-triazino[4,3-a][1,4]benzodiazepin-2(1H)-ones of formula Ia are converted to the corresponding 3,5-dihydro-as-triazino[4,3-a][1,4]benzodiazepine-2(1H)-thiones of formula Ib; for example the compounds prepared in Examples 11-22, above, are converted to the corresponding 2(1H)-thiones (Ib). The following conversions are representative:

9-chloro-7-(o-chlorophenyl)-3,5-dihydro-as-triazino-[4,3-a][1,4]benzodiazepin-2(1H)-one (Ia) to 9-chloro-7-(o-chlorophenyl)-3,5-dihydro-as-triazino[4,3-a][1,4]-benzodiazepine-2(1H)-thione (Ib);

9-chloro-7-(o-chlorophenyl)-3,5-dihydro-3-methyl-as-triazino[4,3-a][1,4]benzodiazepin-2(1H)-one (Ia) to 9-chloro-7-(o-chlorophenyl)-3,5-dihydro-3-methyl-as-triazino-[4,3-a][1,4]benzodiazepine-2(1H)-thione (Ib);

7-(o-chlorophenyl)-3,5-dihydro-as-triazino[4,3-a][1,4]-benzodiazepin-2(1H)-one (Ia) to 7-(o-chlorophenyl)-3,5-dihydro-as-triazino[4,3-a][1,4]benzodiazepine-2(1H)-thione (Ib);

7-(o-chlorophenyl)-3,5-dihydro-3-methyl-as-triazino-[4,3-a][1,4]benzodiazepin-2(1H)-one (Ia) to 7-(o-chlorophenyl)-3,5-dihydro-3-methyl-as-triazino[4,3-a][1,4]benzodiazepine-2(1H)-thione (Ib);

9-chloro-3,5-dihydro-3-methyl-7-phenyl-as-triazino-[4,3-a][1,4]benzodiazepin-2(1H)-one (Ia) to 9-chloro-3,5-dihydro-3-methyl-7-phenyl-as-triazino[4,3-a][1,4]benzodiazepine-2(1H)-thione (Ib); and the like.

Example 24 9-chloro-3,5-dihydro-7-phenyl-as-triazino-[4,3-a][1,4]benzodiazepin-2(1H)-one 6-oxide (Ic)

A stirred solution of 1.0 g. of 9-chloro-3,5-dihydro-7-phenyl-as-triazino[4,3-a][1,4]benzodiazepin-2(1H)-one (Ia) in absolute ethanol in an ice bath is treated with 1.0 g. of m-chloroperbenzoic acid. The mixture is allowed to stand in the ice bath for about 8 hours and at room temperature at about 24° C. for approximately 18 hours. It is then concentrated in vacuo and the residue thus obtained is suspended in cold, dilute aqueous potassium carbonate solution and extracted with methylene chloride. The extract is washed with water, dried and concentrated in vacuo. The residue thus obtained is chromatographed on 100 g. of silica gel and eluted therefrom to give 9-chloro-3,5-dihydro-7-phenyl-as-triazino[4,3-a][1,4]benzodiazepin-2(1H)-one 6-oxide (Ic).

Example 25 9-chloro-3,5-dihydro-7-phenyl-as-triazino-[4,3-a][1,4]benzodiazepine-2(1H)-thione 6-oxide A stirred mixture of 1.0 g. of 9-chloro-3,5-dihydro-7-phenyl-as-triazino[4,3-a][1,4]benzodiazepine-2(1H)-thione (Ia) in absolute ethanol in an ice bath is treated with 1.0 g. of m-chloroperbenzoic acid. The mixture is allowed to stand in the ice bath for about 8 hours and at room temperature at about 24° C. for approximately 18 hours. It is then concentrated in vacuo and the residue thus obtained is suspended in cold, dilute aqueous potassium carbonate solution and extracted with methylene chloride. The extract is washed with water, dried and concentrated in vacuo. The residue thus obtained is chromatographed on 100 g. of silic gel and eluted therefrom to give 9-chloro-3,5-dihydro-7-phenyl-as-triazino[4,3-a][1,4]benzodiazepine-2(1H)-thione 6-oxide.

In the same manner following the procedure of Examples 24 and 25 above other 3,5-dihydro-as-triazino[4,3-a][1,4]-benzodiazepin-2(1H)-ones of formula Ia and other 3,5-dihydro-as-triazino[4,3-a][1,4]benzodiazepine-2(1H)-thiones of formula Ib, for example those compounds prepared in Examples 11–23 above, can likewise be converted to the corresponding 6-oxides of formula Ic. The following conversions are representative:

9-chloro-7-(o-chlorophenyl)-3,5-dihydro-as-triazino-[4,3-a][1,4]benzodiazepin-2(1H)-one (Ia) to 9-chloro-7-(o-chlorophenyl)-3,5-dihydro-as-triazino[4,3-a][1,4]benzodiazepin-2(1H)-one 6-oxide (Ic);

9-chloro-7-(o-chlorophenyl)-3,5-dihydro-3-methyl-as-triazino[4,3-a][1,4]benzodiazepin-2(1H)-one (Ia) to 9-chloro-7-(o-chlorophenyl)-3,5-dihydro-3-methyl-as-triazino-[4,3-a][1,4]benzodiazepin-2(1H)-one 6-oxide (Ic);

7-(o-chlorophenyl)-3,5-dihydro-as-triazino[4,3-a][1,4]-benzodiazepin-2(1H)-one (Ia) to 7-(o-chlorophenyl)-3,5-dihydro-as-triazino[4,3-a][1,4]benzodiazepin-2(1H)-one 6-oxide (Ic);

7-(o-chlorophenyl)-3,5-dihydro-3-methyl-as-triazino-[4,3-a][1,4]benzodiazepin-2(1H)-one (Ia) TO 7-(o-chlorophenyl)-3,5-dihydro-3-methyl-as-triazino[4,3-a]-[1,4]benzodiazepin-2(1H)-one 6-oxide (Ic);

9-chloro-3,5-dihydro-3-methyl-7-phenyl-as-triazino-[4,3-a][1,4]benzodiazepin-2(1H)-one (Ia) to 9-chloro-3,5-dihydro-3-methyl-7-phenyl-as-triazino[4,3-a][1,4]benzodiazepin-2(1H)-one 6-oxide (Ic);

9-chloro-7-(o-chlorophenyl)-3,5-dihydro-as-triazino-[4,3-a][1,4]benzodiazepine-2(1H)-thione (Ib) to 9-chloro-7-(o-chlorophenyl)-3,5

7-(o-chlorophenyl)-3,5-dihydro-as-triazino[4,3-a][1,4]-benzodiazepine-2(1H)-thione (Ib) to 7-(o-chlorophenyl)-3,5-dihydro-as-triazino[4,3-a][1,4]benzodiazepine-2(1H)-thione 6-oxide (Ic);

7-(o-chlorophenyl)-3,5-dihydro-3-methyl-as-triazino-[4,3-a][1,4]benzodiazepine-2(1H)-thione (Ib) to 7-(o-chlorophenyl)-3,5-dihydro-3-methyl-as-triazino[4,3-a][1,4]-benzodiazepine-2(1H)-thione 6-oxide (Ic);

9-chloro-3,5-dihydro-3-methyl-7-phenyl-as-triazino-[4,3-a][1,4]benzodiazepine-2(1H)-thione (Ib) to 9-chloro-3,5-dihydro-3-methyl-7-phenyl-as-triazino[4,3-a][1,4]-benzodiazepine-2(1H)-thione 6-oxide (Ic); and the like.

Example 26  9-chloro-3,5-dihydro-3-methyl-7-phenyl-as-triazino[4,3-a][1,4]benzodiazepin-2(1H)-one (Ia)

To a solution of 9-chloro-3,5-dihydro-7-phenyl-as-triazino[4,3-a][1,4]benzodiazepin-2(1H)-one (Ia) in dimethylformamide is added 1 molar equivalent of sodium hydride. The reaction mixture is stirred for about 5 hours to complete the formation of the sodium salt. One molar equivalent of methyl iodide is then added and the reaction mixture is heated at about 95° C. until the reaction is complete. The solvent is then removed in vacuo and about 100 ml. of water is added. Extraction with methylene chloride and evaporation of the solvent gives 9-chloro-3,5-dihydro-3-methyl-7-phenyl-as-triazino[4,3-a][1,4]benzodiazepin-2(1H)-one (Ia).

Following the procedure of Example 26 other compounds of formula Ia, wherein $R_2$ is hydrogen, can be reacted with an alkyl halide to obtain the compounds of formula Ia wherein $R_2$ is alkyl.

I claim:

1. A compound of the formula:

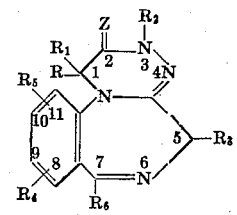

I wherein $R$, $R_1$ and $R_2$ are each selected from the group consisting of hydrogen and alkyl of 1 to 3 carbon atoms, inclusive; $R_3$ is selected from the group consisting of hydrogen, alkyl of 1 to 3 carbon atoms, inclusive, hydroxy, acetoxy and propionyloxy; $R_4$ and $R_5$ are each selected from the group consisting of hydrogen, alkyl of 1 to 3 carbon atoms, inclusive, halogen, nitro, cyano, amino, trifluoromethyl, alkoxy, alkylthio, alkylsulfinyl, alkylsulfonyl, alkanoylamino and dialkylamino in which the carbon chain moieties are of 1 to 3 carbon atoms, inclusive; $R_6$ is selected from the group consisting of pyridyl, 2-pyrimidinyl, furyl, pyrrolyl, thienyl, cycloalkyl of 5 to 7 carbonatoms, inclusive, cycloalkenyl of 5 to 7 carbon atoms, inclusive, and a phenyl radical of the formula

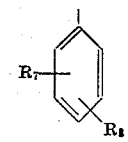

in which $R_7$ and $R_8$ each have the same meanings as given above for $R_4$ and $R_5$; and Z is selected from the group consisting of oxygen and sulfur.

2. 9-chloro-3,5-dihydro-7-phenyl-as-triazino[4,3-a][1,4]-benzodiazepin-2(1H)-one, the compound of claim 1 wherein $R$, $R_1$, $R_2$, $R_3$ and $R_5$ are each hydrogen, $R_4$ is 9-chloro, $R_6$ is phenyl and Z is oxygen.

3. 9-chloro-7-(o-chlorophenyl)-3,5-dihydro-as-triazino-[4,3-a][1,4]benzodiazepin-2(1H)-one, the compound of claim 1 wherein $R$, $R_1$, $R_2$, $R_3$ and $R_5$ are each hydrogen, $R_4$ is 9-chloro, $R_6$ is o-chlorophenyl and Z is oxygen.

4. 9-chloro-7-(o-chlorophenyl)-3,5-dihydro-3-methyl-as-triazino[4,3-a][1,4]benzodiazepin-2(1H)-one, the compound of claim 1 wherein $R$, $R_1$, $R_3$ and $R_5$ are each hydrogen, $R_2$ is methyl, $R_4$ is 9-chloro, $R_6$ is o-chlorophenyl and Z is oxygen.

5. 7-(o-chlorophenyl)-3,5-dihydro-as-triazino[4,3-a][1,4]-benzodiazepin-2(1H)-one, the compound of claim 1 wherein $R$, $R_1$, $R_2$, $R_3$, $R_4$ and $R_5$ are each hydrogen, $R_6$ is o-chlorophenyl and Z is oxygen.

6. 7-(o-chlorophenyl)-3,5-dihydro-3-methyl-as-triazino-[4,3-a][1,4]benzodiazepin-2(1H)-one, the compound of claim 1 wherein $R$, $R_1$, $R_3$, $R_4$ and $R_5$ are each hydrogen, $R_2$ is methyl, $R_6$ is o-chlorophenyl and Z is oxygen.

7. 9-chloro-3,5-dihydro-3-methyl-7-phenyl-as-triazino-[4,3-a][1,4]benzodiazepin-2(1H)-one, the compound of claim 1 wherein R, $R_1$, $R_3$, and $R_5$ are each hydrogen, $R_2$ is methyl, $R_4$ is 9-chloro, $R_6$ is phenyl and Z is oxygen.

8. A compound of the formula:

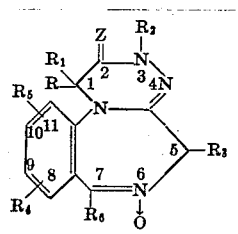

wherein R, $R_1$ and $R_2$ are each selected from the group consisting of hydrogen and alkyl of 1 to 3 carbon atoms, inclusive; $R_3$ is selected from the group consisting of hydrogen, alkyl of 1 to 3 carbon atoms, inclusive, hydroxy, acetoxy and propionyloxy; $R_4$ and $R_5$ are each selected from the group consisting of hydrogen, alkyl of 1 to 3 carbon atoms, inclusive, halogen, nitro, cyano, amino, trifluoromethyl, alkoxy, alkylthio, alkylsulfinyl, alkylsulfonyl, alkanoylamino and dialkylamino in which the carbon chain moieties are of 1 to 3 carbon atoms, inclusive; $R_6$ is selected from the group consisting of pyridyl, 2-pyrimidinyl, furyl, pyrrolyl, thienyl, cycloalkyl of 5 to 7 carbon atoms, inclusive, cycloalkenyl of 5 to 7 carbon atoms, inclusive, and a phenyl radical of the formula

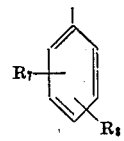

in which $R_7$ and $R_8$ each have the same meanings as given above for $R_4$ and $R_5$; and Z is selected from the group consisting of oxygen and sulfur.

* * * * *